United States Patent
Betz et al.

(10) Patent No.: US 12,134,993 B2
(45) Date of Patent: Nov. 5, 2024

(54) METHOD FOR DETERMINING THE MASS FLOW IN AN INTERNAL COMBUSTION ENGINE

(71) Applicant: SYSTEC AUTOMOTIVE GMBH, Puchheim (DE)

(72) Inventors: Oliver Betz, Groebenzell (DE); Ben Abdelkader Haithem, Puchheim (DE)

(73) Assignee: Systec Automotive GmbH, Puchheim (DE)

( * ) Notice: Subject to any disclaimer, the term of this patent is extended or adjusted under 35 U.S.C. 154(b) by 276 days.

(21) Appl. No.: 17/766,357

(22) PCT Filed: Oct. 2, 2020

(86) PCT No.: PCT/EP2020/077720
§ 371 (c)(1),
(2) Date: Apr. 4, 2022

(87) PCT Pub. No.: WO2021/064207
PCT Pub. Date: Apr. 8, 2021

(65) Prior Publication Data
US 2023/0288240 A1  Sep. 14, 2023

(30) Foreign Application Priority Data
Oct. 4, 2019 (DE) ............. 10 2019 126 783.8

(51) Int. Cl.
| | | |
|---|---|---|
| *F02D 41/18* | (2006.01) | |
| *F02D 41/28* | (2006.01) | |
| *G01F 1/50* | (2006.01) | |
| *G01F 1/72* | (2006.01) | |
| *G01F 1/88* | (2006.01) | |
| *F02D 41/14* | (2006.01) | |

(52) U.S. Cl.
CPC ............. *F02D 41/18* (2013.01); *F02D 41/28* (2013.01); *G01F 1/50* (2013.01); *G01F 1/72* (2013.01); *G01F 1/88* (2013.01); *F02D 2041/1432* (2013.01); *F02D 2041/1433* (2013.01); *F02D 2041/285* (2013.01)

(58) Field of Classification Search
CPC ........ F02D 41/18; F02D 41/182; F02D 41/28; F02D 2041/1432; F02D 2041/1433; F02D 2041/285; G01F 1/50; G01F 1/72; G01F 1/88
See application file for complete search history.

(56) References Cited

U.S. PATENT DOCUMENTS

| | | |
|---|---|---|
| 5,646,344 A | 7/1997 | Konzelmann |
| 2006/0224298 A1 | 10/2006 | Lang |
| 2011/0313687 A1 | 12/2011 | Collet et al. |
| 2021/0108952 A1 * | 4/2021 | Kitahara ............... G01F 15/046 |

FOREIGN PATENT DOCUMENTS

| | | | |
|---|---|---|---|
| DE | 102013106723 A1 | | 12/2014 |
| JP | H07119525 A | * | 5/1995 |

* cited by examiner

*Primary Examiner* — Hung Q Nguyen
*Assistant Examiner* — Mark L. Greene

(57) ABSTRACT

A method for determining mass flow according to the differential pressure method on an internal combustion engine, includes calculating a mass flow signal by using sensors of a mass flow meter to measure a differential pressure, an absolute pressure and a temperature of the mass flow. The mass flow signal is filtered by an evaluation unit of the mass flow meter and the filtered mass flow signal is sent to an engine control. The filter parameters are matched to a measurement situation by the evaluation unit. In a first measurement situation, the filter parameters are set on the basis of an analysis of pulsations of the current measured values and in a second measurement situation, the filter parameters are set on the basis of status data of the internal combustion engine transmitted by the engine control unit. A mass flow meter and a probe are also provided.

7 Claims, No Drawings

METHOD FOR DETERMINING THE MASS FLOW IN AN INTERNAL COMBUSTION ENGINE

FIELD AND BACKGROUND OF THE INVENTION

The invention relates to a method for determining the mass flow according to the differential pressure method on an internal combustion engine, wherein for calculating a mass flow signal a mass flow meter preferably consists of a combination of one or more sensors for differential pressure, absolute pressure, temperature, humidity and gas composition and a computing unit. The mass flow signal is calculated and filtered by the evaluation unit from the measured sensor values, whereby the filtered mass flow signal is sent to the engine control unit. Furthermore, the invention relates to an evaluation unit for determining the mass flow in an internal combustion engine, wherein the evaluation unit comprises an interface to a data bus system of an engine control of the internal combustion engine.

Mass flow meters that measure air mass or exhaust gas mass (EGR) in combustion engines have to contend with a variety of disturbance variables. The gas mass flows in combustion engines are subject to massive pressure and flow fluctuations, so-called pulsations, as well as rapid changes in temperature and composition. The closer the measurement is to the cylinder, the higher these pulsations and fluctuations in measured values. Particularly the measurement of exhaust gas that is to be returned to the combustion air, the exhaust gas recirculation (AGR or EGR), proves to be very difficult in this respect.

The AGR and the combustion air are measured on many combustion engines according to the differential pressure principle. With the differential pressure principle, kinetic energy, i.e. the flow velocity, is converted into potential energy, i.e. into a pressure gradient (differential pressure). The measured differential pressure is thus a measure of the flow velocity of the mass flow. Due to the quadratic characteristic of kinetic energy, the pressure gradient generated is in particular. very small at low velocities of the mass flow and the associated low flow rates.

Unfavorably, the pressure and flow pulsations are also very high on the combustion engine, especially with low flow rates of the AGR/EGR. Due to the low speeds of the combustion engine, which may also be combined with high load values, particularly distinctive pulsations occur. The useful signal/interference signal ratio is therefore very unfavorable for measurements according to the differential pressure (dp) at these points. Attempts are currently being made to compensate for this by using suitable filters to attenuate the measurement signal.

Such filtering and the filter parameters on which they are based are very complex in differential pressure measurement and relate in particular to the filtering of absolute pressure (pabs), differential pressure (dp), temperature (temp) and gas composition before and after mass flow calculation and to the filtering of the calculated mass flow signal and the calculated medium density. Depending on the type, frequency and height of the pulsations, an optimal measurement result is achieved by different filtering. Such a multipolar filter, which is adapted to the current pulsation characteristics of the motor, has clear advantages over a fixed filter.

A multipolar filter performs a self-adaptive filtering whose result depends on the measurement dynamics: In order to achieve an optimal control quality, the multipolar filter must be adapted to the current measurement situation. This can be done by an intelligent analysis of the pulsations of the current measured values (dp, pabs, temp, gas composition). For this purpose, the pulsation level and frequency of the raw measured values are analyzed in particular and the filter parameters for the different filters are then optimized from this.

The disadvantage of self-adaptive filtering is the fact that a number of pulsations caused by the valve openings in the cylinder must first be analyzed in order to determine new filter parameters. These are typically 2-3 ignition timings of all cylinders or 4-6 engine revolutions (at e.g. 800 rpm, 4 revolutions correspond to 300 mS). Especially with dynamic load change operation and low engine speeds, as is often the case with commercial vehicle engines, this can be too slow to achieve sufficient control quality in the load change case.

However, for emission-optimized control of combustion engines, high accuracy of the air mass measurement, high signal quality and stability of the measured values with simultaneously high measurement dynamics are required. According to the current state of the art, however, these measurement parameters are mutually exclusive. A poor signal-to-noise ratio leads to poor accuracies, a high damping and thus control quality leads to low signal dynamics.

SUMMARY OF THE INVENTION

This application sets itself the task of optimizing the control of internal combustion engines. For this purpose, it proposes a method and a mass flow meter as described below. Some preferred embodiments of the invention are mentioned in the respective subclaims.

DETAILED DESCRIPTION OF THE INVENTION

An essential basic idea of the invention is to propose a method in which the filter parameters of the evaluation unit are matched to a measurement situation, wherein in a first measurement situation the filter parameters are set on the basis of an analysis of pulsations of the current measured values and wherein in a second measurement situation the filter parameters are set on the basis of current status data of the internal combustion engine transmitted by the engine control. A further essential basic idea is to propose a mass flow meter for determining the mass flow in an internal combustion engine, in which the filter parameters of the mass flow signal are determined on the basis of status data of the internal 1 combustion engine which are available in the engine control.

Such a mass flow meter preferably has a combination of one or more sensors for differential pressure, absolute pressure, temperature, humidity and gas composition and an evaluation unit. The gas composition can alternatively or additionally be calculated by the evaluation unit from a model which determines the EGR rate from a ratio of EGR mass to air mass.

These basic ideas make it possible to provide a second measurement situation for determining the mass flow, in which an engine-dynamically adaptive filter is used. In the second measurement situation, no filter parameters are determined by the sensor in a self-adaptive manner, but are optimized by a status signal transmitted by the combustion engine, in particular by the engine control of the combustion engine. At the moment of the load or speed change, the sensor can therefore immediately set the filter parameters anew and optimally. This ensures optimal control quality of the measured values in the second measurement situation as well.

These features enable an intelligent mass flow meter that measures at least the pressure, the temperature and the differential pressure internally and communicates with the engine control unit (ECU) of the internal combustion engine via a data bus, in particular digitally, for example via CAN-BUS. The evaluation unit according to the invention not only sends its measured values to the ECU, but also receives relevant engine characteristics or status data from the ECU, such as engine speed, load, flap position of the EGR or throttle valve. A status signal or status data of the internal combustion engine therefore includes data of the internal combustion engine that relate to its current status. In a particularly preferred embodiment, these signals or data also relate to imminent changes in the state of the internal combustion engine, for example due to control signals currently given to the internal combustion engine, which will result in a change in the state of the engine (e.g. load call by the driver).

Especially at low speeds of the combustion engine, it is advantageous if the values measured by the sensors are filtered before the mass flow signal is calculated and the result of the mass flow calculation is subjected to further filtering. This makes it possible to generate a stable signal for the control.

In addition to measuring flows, there is also the possibility of simulating such flows (whether EGR or air) using engine models, so-called filling models. This is difficult for engine control because the engine characteristics change during operation. In particular, the ageing of EGR coolers and also the wear on cylinders and seals cause the filling model to deteriorate noticeably. However, the evaluation unit according to the invention opens up the possibility of integrating a filling model and adapting it continuously. A filling model is particularly interesting where the evaluation unit itself functions poorly, e.g. at low flow rates and high pulsations due to, for example, low speed, high load or an unfavorable signal/noise ratio. Here, the evaluation unit can switch to a load/speed/valve position-based model.

It is particularly advantageous if the filling model is adapted to the wear of components of the combustion engine. Ideally, for this measurement situation, the evaluation unit can optimize itself on the basis of the data obtained in the favorable load range, such as high speed and high load, and also adapt continuously to the changing engine characteristics due to ageing during operation of the vehicle.

The invention claimed is:

1. A method for determining a mass flow according to a differential pressure method on an internal combustion engine, the method comprising:
    calculating a mass flow signal by using sensors of a mass flow meter of the internal combustion engine to measure a differential pressure, an absolute pressure and a temperature of a mass flow;
    using an evaluator of the mass flow meter to filter the mass flow signal by matching filter parameters to measurement situations including a first measurement situation in which the filter parameters are set on a basis of an analysis of pulsations of current measured values and a second measurement situation in which the filter parameters are set on a basis of status data of the internal combustion engine transmitted by an engine control unit;
    using a data bus for communication between the mass flow meter and the engine control unit; and
    sending the filtered mass flow signal to the engine control unit.

2. The method according to claim 1, which further comprises providing at least one of a load state or a rotational speed of the internal combustion engine or a flap position of an exhaust gas recirculation system of the internal combustion engine, as the status data of the internal combustion engine.

3. The method according to claim 1, which further comprises carrying out a change from the first measurement situation to the second measurement situation during a load change of the internal combustion engine.

4. The method according to claim 1, which further comprises using a filling model of the internal combustion engine to determine the filter parameters in a third measurement situation.

5. The method according to claim 4, which further comprises adapting the filling model to a wear of components of the internal combustion engine.

6. A mass flow meter for carrying out the method according to claim 1 for determining a mass flow in an internal combustion engine, the mass flow meter comprising:
    the sensors for measuring a differential pressure, an absolute pressure and a temperature of a mass flow;
    the evaluator for calculating the mass flow signal; and
    an interface to the data bus of an engine control system of the internal combustion engine;
    the filter parameters for filtering the mass flow signal containing the status data of the internal combustion engine.

7. The mass flow meter according to claim 6, wherein the status data includes at least one of a load state or a rotational speed of the internal combustion engine or a flap position of an exhaust gas recirculation system of the internal combustion engine.

* * * * *